F. W. L. Knuschke,
Pitcher-Lid Lifter,
Nº 65,757. Patented June 11, 1867.
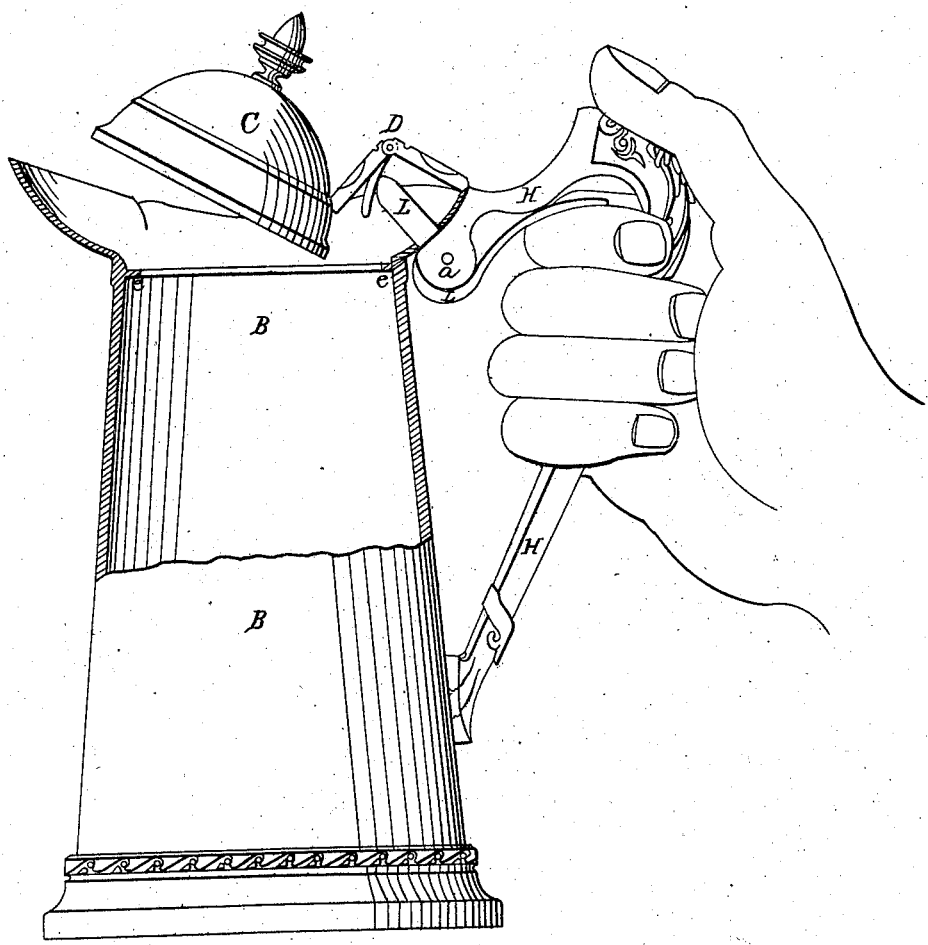

United States Patent Office.

FERDINAND W. L. KNUSCHKE, OF PROVIDENCE, RHODE ISLAND, ASSIGNOR TO THE GORHAM MANUFACTURING COMPANY, OF THE SAME PLACE.

Letters Patent No. 65,757, dated June 11, 1867.

IMPROVED LIFTER FOR THE LIDS OF PITCHERS.

The Schedule referred to in these Letters Patent and making part of the same

TO ALL WHOM IT MAY CONCERN:

Be it known that I, FERDINAND W. L. KNUSCHKE, of the city and county of Providence, and State of Rhode Island, have invented a new and improved Lifter or Device for Lifting the Lid of Ice-Pitchers, Sirup-Pitchers, and similar utensils preparatory to pouring the liquid therefrom; and I do hereby declare that the following is a full, clear, and exact description of the same, reference being had to the accompanying drawings making part of this specification, in which is represented—

A side elevation and section of a sirup-pitcher with the lid lifted by my improved device.

My said invention consists of a lever arranged with the handle and hinged lid of a pitcher or like utensil in such a manner that the lid may be conveniently lifted by the hand in the act of pouring the liquid therefrom.

In the drawings, B is the body, and C is the lid of the pitcher, the lid being hinged to the body at D, and shutting closely upon the ledge or lip $e\ e$, for the purpose of excluding foreign substances and the heat of the surrounding atmosphere. H is the handle of the pitcher, and L is the lifter, by means of which the lid C is lifted. This lifter is a lever pivoted at $a$, in such a position with respect to both the handle and the lid that one end of the lever may be moved by the hand as it grasps the handle in the act of pouring, and, being so moved, cause the opposite end of the lever that is contiguous to the lid to bear against the hinge or other suitable portion of the lid, and to swing the lid upon its hinge and lift it from the pitcher to allow the liquid to escape therefrom.

What I claim, and desire to secure by Letters Patent, is—

The lifter or lever, in combination with the handle and hinged lid of a pitcher or other vessel, substantially as described for the purpose specified.

F. W. L. KNUSCHKE

Witnesses:
 ISAAC A. BROWNELL,
 GORHAM THURBER.